Figure 1:
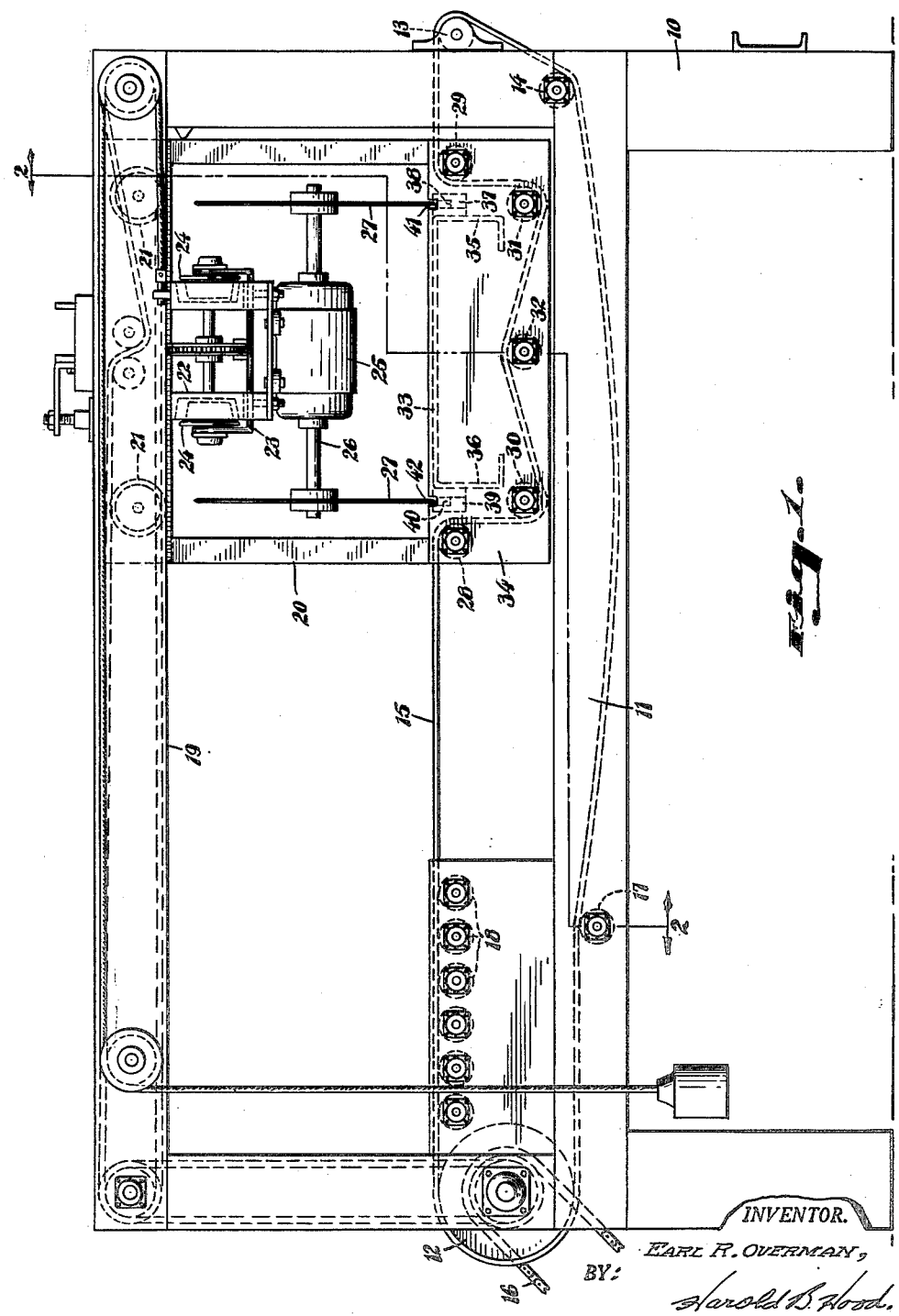

June 29, 1954 E. R. OVERMAN 2,682,307
CONVEYER BELT WITH FLYING MECHANISM
Filed May 28, 1951 2 Sheets-Sheet 1

INVENTOR.
EARL R. OVERMAN,
BY:
Harold B. Hood.
ATTORNEY.

June 29, 1954     E. R. OVERMAN     2,682,307
CONVEYER BELT WITH FLYING MECHANISM
Filed May 28, 1951     2 Sheets-Sheet 2
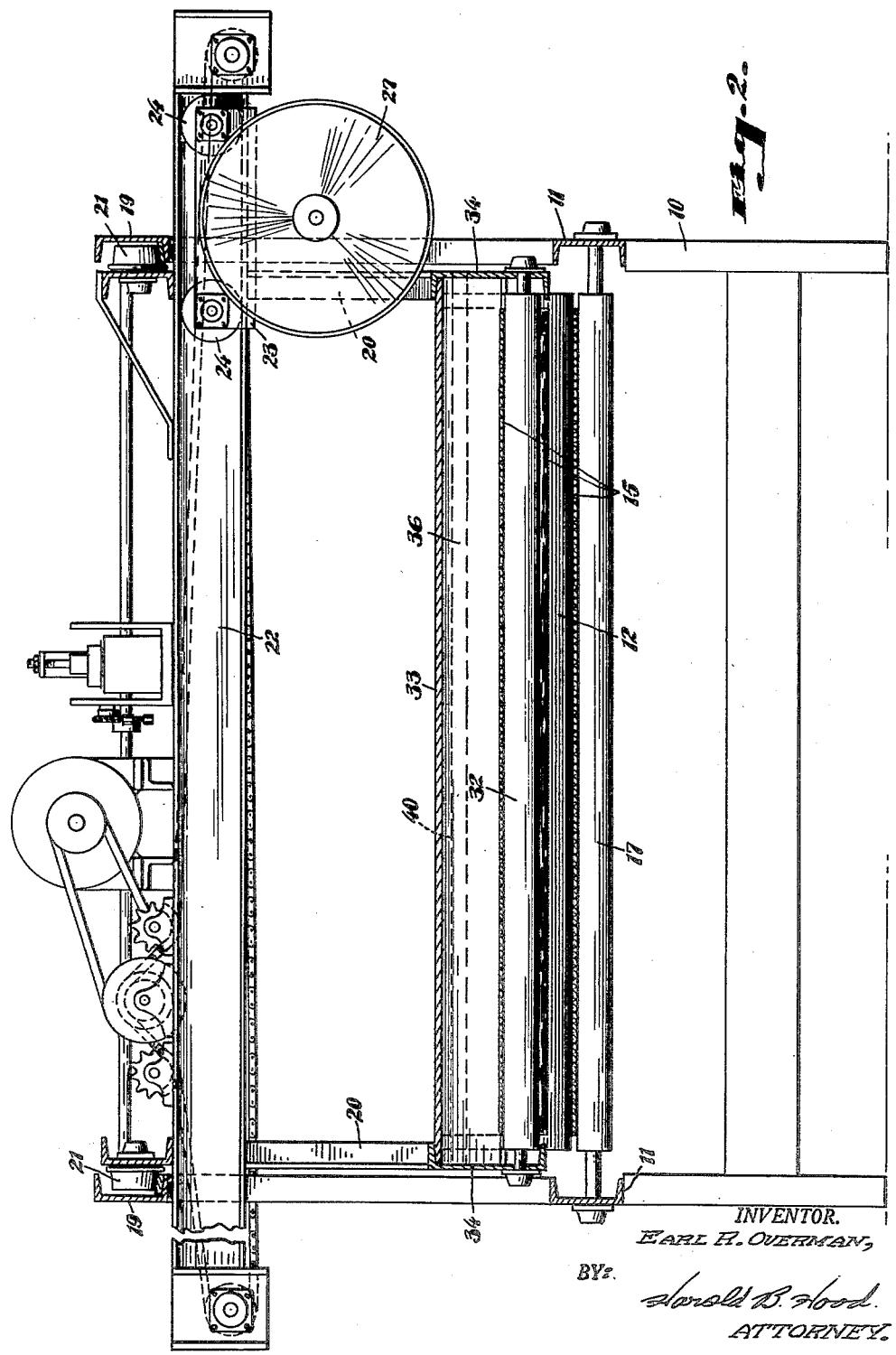
INVENTOR.
EARL R. OVERMAN,
BY:
Harold B. Hood.
ATTORNEY.

Patented June 29, 1954

2,682,307

UNITED STATES PATENT OFFICE 2,682,307

CONVEYER BELT WITH FLYING MECHANISM

Earl R. Overman, Wabash, Ind.

Application May 28, 1951, Serial No. 228,700

4 Claims. (Cl. 164—76)

The present invention relates to a conveyor belt with which is associated a flying mechanism for performing an operation upon work being forwarded upon the belt. The primary object of the invention is to provide a structure in which work may be performed upon a continuously-moving stream of material, particularly when the work to be performed is of such character that a tool must penetrate the flowing stream of material so that, if the belt upon which the material is being forwarded were currently in supporting relation with that portion of the material upon which the work is performed, the belt might be damaged; the structure being such as to prevent such damage. More specifically, it is an object of the invention to provide a flying tool-carrying frame, adapted to be synchronized with a flowing stream of material, during a period of tool engagement with that material, the flying frame being so constructed and arranged as to hold the work-advancing mechanism offset from that region of the work attacked by the tool, during engagement of the tool with the work.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation of a machine constructed in accordance with the present invention; and Fig. 2 is a transverse section therethrough taken substantially on the line 2, 2 of Fig. 1.

Referring more particularly to the drawings, it will be seen that I have illustrated a frame, indicated generally by the reference numeral 10, and comprising a bed 11 adjacent opposite ends of which are journalled rollers 12, 13 and 14 about which is trained an endless conveyor web 15. The web 15 may be of any suitable known type, provided only that it must be readily flexible about axes transverse to its length; and I presently believe that a flexible wire mesh belt will constitute the optimum form of web 15 for use in embodiments of the present invention.

At least one of the rolls upon which the web is trained, for instance, the roll 12, will be continuously driven by any suitable means, suggested by the illustration of a chain 16 in Fig. 1. One dead roll 17 is journalled upon the machine bed near the roll 12 to guide the lower, return reach of the web, the otherwise-unsupported weight of the web between the rolls 14 and 17 being effective to maintain the desired degree of tension throughout the length of the web. Live or dead rolls 18 may, if desired, be suitably located to support a portion of the upper reach thereof.

The frame is formed to provide a trackway 19 above, and extending in the line of travel of, the upper reach of the web 15; and an auxiliary frame 20 is carried upon wheels 21 supported in said trackway.

The auxiliary frame provides a second trackway 22, extending transversely of the line of travel of the web 15 and projecting laterally beyond both edges of said web; and a carriage 23 is supported upon wheels 24 running in the trackway 22. An electric motor 25 depends from the carriage 23, in the illustrated embodiment of the invention, and its spindle 26 projects oppositely from the motor frame to carry two rotary knives 27, 27 spaced in the direction of travel of the web 15.

Suitable means is provided for driving the auxiliary frame 20, periodically, in the direction of travel of, and in synchronism with, the upper reach of the web 15, and for returning said auxiliary frame after it has moved with that web reach over a predetermined distance. Suitable means is further provided for causing the carriage 23 to move, during travel of the auxiliary frame 20 synchronously with the upper reach of the web 15, from a position in which the knives are laterally offset from one edge of the web to a position in which the knives are laterally offset from the opposite edge thereof.

The means for effecting such travel of the auxiliary frame 20 and of the carriage 23 form no part of the present invention, and therefore such means will not herein be described in detail. Suffice it to say that any known means for accomplishing the desired movement may be used, for instance, mechanism analogous to that disclosed in my copending application for "Batting Machine," Serial Number 762,362, filed July 21, 1947, now Patent No. 2,610,688.

In its intended use, the upper reach of the web 15 will support, and transport from one end of the machine to the other, a continuously-flowing stream of material or a series of work pieces to be acted upon by the knives 27. To that end, the rolls 12 and 13 are so disposed as to be tangent to a common plane, usually a horizontal plane. Upon the auxiliary frame 20, I journal two idler rolls 28 and 29, said rolls being mounted for rotation upon axes spaced in the direction of travel of the web and parallel with the axes of the rolls 12 and 13, and each of said idler rolls has its uppermost surface tangent to the said common plane. Two additional idler rolls 30 and 31 are journalled upon the auxiliary frame 20, between the locations of the rolls 28 and 29, and upon parallel axes, and said rolls 30 and 31 have their lowermost surfaces depressed substantially below the said common plane. In the illustrated embodiment of the invention, the rolls 30 and 31 are bodily displaced downwardly from the rolls 28 and 29. I presently believe that it is desirable to journal still another idler roll 32 between the rolls 30 and 31 with its axis preferably disposed in a plane common to the axes of the rolls 30 and 31.

The upper reach of the web 15 extends, as shown, from the roll 13 to the roll 29, substantially in said tangent plane; but the web is turned about the roll 29 and is led beneath the roll 31, then over the roll 32, then beneath the roll 30, and then back around the roll 28 to extend therefrom to the roll 12 substantially in said tangent plane. Thereby, that section of the upper reach of the web 15 which extends between the rolls 29 and 28 is displaced out of, and substantially below, the said tangent plane in which the work material will flow.

In the illustrated embodiment of the invention, in which there is a substantial space between the rolls 28 and 29, I prefer to support, upon the frame 20, a work-supporting table 33 which will preferably include downturned flanges 35 and 36 suitably secured to, and spanning, the upstanding side walls 34, 34 of the frame 20. The table 33 is disposed in the said tangent plane; and its extent, in the direction of flow of work material through the machine, is only slightly less than the distance between the axes of the rolls 28 and 29. Preferably, a rail 37 will be supported upon the flange 35 and between that flange and the roller 29, said rail being formed to define an upwardly-opening slot 38 registering with the path of travel of one of the knives 27; and a similar rail 39 will be correspondingly carried by the flange 36 to define a slot 40 opening upwardly and registering with the other knife 27. Said slots 38 and 40 register, also, with notches 41 and 42 cut in the side walls 34, 34 of the frame 20 to permit passage of the knives 27, respectively.

While the auxiliary frame 20 is stationary, of course, the upper reach of the web 15 will flow past the rollers 28, 29, 30, 31 and 32, turning said rollers as it moves. When, however, the driving means for the frame 20 becomes active to move said frame in the direction of travel of the web reach, the web portion engaging those rollers will be stationary with respect thereto, as the auxiliary frame travels with the web reach; and, after the auxiliary frame has reached the end of its leftward stroke and is returned to its illustrated position, the velocity of the web relative to the rollers 28, 29, 30, 31 and 32 will, of course, be the sum of the web velocity and the auxiliary frame velocity in the opposite direction.

Work, carried upon the upper reach of the web 15, will bridge the space between the rollers 28 and 29, and in that region, it will be attacked by the knives 27 or such other tools as may be carried upon the auxiliary frame 20. Thus, the knives or other tools may completely penetrate the work, but, since the registering portion of the web is displaced below the plane tangent to the rollers 12, 13, 28 and 29, the web will be protected against possible damage from the knives or other tools.

Where a single knife or other tool is used, of course, the spacing between the rolls equivalent to rollers 28 and 29 will be rather narrow, and in some such systems, it may be feasible to dispense with the table 33 and/or the rails 37 and 39.

I claim as my invention:

1. In a machine of the class described, a main frame, rotor means mounted adjacent opposite ends of said frame, an endless, flexible conveyor web trained about said rotors, means for driving said web, a trackway extending longitudinally of said frame, an auxiliary frame supported for movement along said trackway, said auxiliary frame providing a guideway extending transversely of said main frame beyond the lateral edges of said web, a carriage supported to travel along said guideway, cutter means mounted on said carriage and arranged to intersect the travel plane of work carried on said web, means for driving said carriage transversely of the path of travel of such work while driving said auxiliary frame in synchronism with such work, and guide means supported on said auxiliary frame offset from the travel plane of such work in a direction away from said cutter means for sustaining that region of said web currently registering with said cutter means out of such travel plane.

2. In a machine of the class described, a main frame, rotor means adjacent opposite ends of said frame having surfaces disposed tangent to a common plane, an endless flexible conveyor web trained about said rotors, a trackway extending longitudinally of said frame, an auxiliary frame supported to travel oppositely along said trackway, two guide elements carried by said auxiliary frame on axes spaced apart in the direction of length of said trackway, said guide elements having surfaces disposed substantially in said common plane, a further guide element carried by said auxiliary frame between said first-named guide elements and having a surface displaced from said common plane, said web being threaded about said guide elements whereby a portion of one reach of said web, between said first-named guide elements, is held out of said common plane, and cutter means supported from said auxiliary frame, intersecting said common plane and mounted for travel, within the region between said first-named guide elements, from side to side of said main frame.

3. In a machine of the class described, a main frame, rotor means mounted on said frame adjacent opposite ends thereof for rotation about substantially horizontal parallel axes, said rotor means having upwardly-facing surfaces tangent to a common substantially horizontal plane, a continuous flexible conveyor web trained about said rotors and having an upper reach and a lower reach, parts of the upper reach of said web running in said plane to support and advance a stream of work material, a trackway extending longitudinally of said frame, an auxiliary frame supported to travel oppositely along said trackway, two rollers carried by said auxiliary frame on axes spaced apart in the direction of length of said trackway and having upwardly-facing surfaces substantially tangent to said common plane, two further rollers carried by said auxiliary frame on axes similarly spaced and having downwardly-facing surfaces displaced below said common plane, said upper reach of said web being threaded over said first-named rollers and beneath said last-named rollers, and cutter means supported from said auxiliary frame and intersecting said common plane from above, said cutter means being mounted for travel, within the region between said first-named rollers, from side to side of said main frame.

4. The machine of claim 3 including means carried by said auxiliary frame, between said first-named rollers but out of registry with said cutter means, and providing an upwardly-facing work-supporting surface disposed substantially in said common plane.

References Cited in the file of this patent

UNITED STATES PATENTS

| Number | Name | Date |
|---|---|---|
| 1,924,162 | Mason | Aug. 29, 1933 |
| 2,149,025 | Marion | Feb. 28, 1939 |
| 2,320,652 | Preston | June 1, 1943 |
| 2,427,167 | Thompson | Sept. 9, 1947 |
| 2,550,191 | Godat | Apr. 24, 1951 |
| 2,610,688 | Overman | Sept. 16, 1952 |

FOREIGN PATENTS

| Number | Country | Date |
|---|---|---|
| 338,659 | Germany | June 29, 1921 |